United States Patent [19]
Murray

[11] Patent Number: 5,691,408
[45] Date of Patent: Nov. 25, 1997

[54] PROCESS FOR MANUFACTURING WATER BASED ADHESIVE

[75] Inventor: Robert J. Murray, Kent, Ohio

[73] Assignee: Akron Paint & Varnish, Akron, Ohio

[21] Appl. No.: 612,383

[22] Filed: Mar. 7, 1996

Related U.S. Application Data

[63] Continuation-in-part of Ser. No. 595,929, Feb. 6, 1996, which is a continuation of Ser. No. 305,067, Sep. 13, 1994, abandoned.

[51] Int. Cl.$^6$ .................................................. C08K 3/00
[52] U.S. Cl. ..................... 524/495; 524/284; 524/289; 524/300; 524/302; 524/496; 524/575; 524/575.5; 524/571
[58] Field of Search ..................... 524/495, 496, 524/575, 575.5, 571, 284, 289, 300, 302

[56] References Cited

U.S. PATENT DOCUMENTS

| | | | |
|---|---|---|---|
| 4,623,414 | 11/1986 | Collins et al. | 156/307.5 |
| 4,772,499 | 9/1988 | Greenway | 428/43 |
| 5,395,879 | 3/1995 | Murray | 524/571 |

Primary Examiner—Edward J. Cain
Attorney, Agent, or Firm—Dinsmore & Shohl, LLP

[57] ABSTRACT

A process for manufacturing a water based adhesive which is substantially free of organic solvents and is useful as an adhesive for bonding natural rubber compounds, synthetic rubber compounds and a combination of natural and synthetic rubber compounds, especially during the formation of a tire.

22 Claims, No Drawings

PROCESS FOR MANUFACTURING WATER BASED ADHESIVE

APPLICATION HISTORY

This application is a Continuation-in-Part of application Ser. No. 08/595,929, filed on Feb. 6, 1996, which is a file wrapper continuation of now abandoned application Ser. No. 08/305,067, filed Sep. 13, 1994.

FIELD OF INVENTION

The present invention relates to a process for manufacturing an organic solvent free composition useful as an adhesive for bonding natural rubber compounds, synthetic rubber compounds and a combination of natural and synthetic rubber compounds, and more particularly to a method of producing aqueous adhesive emulsions which may be used for bonding during the formation of a tire.

BACKGROUND OF THE INVENTION

Solvent containing adhesives are most commonly used in tire manufacture because they are easier to work, especially at low temperature, and generally provide a good, quick bonding capacity and good adhesive strength. A serious disadvantage of solvent containing adhesives is the large quantity of organic solvents they contain. The latter are released by evaporation during working and thus result in a considerable odor nuisance which, in such circumstances may even lead to a health risk for the person working with the adhesive. An additional point to note when working with organic solvent based adhesives is that due to the evaporation of organic solvents, explosive solvent/air mixtures may be produced. In view of the hazards associated with the use of organic solvents, it would be desirable to eliminate the amount of organic solvent present in adhesive compositions which are used for bonding, for example, tire tread to a carcass portion during the building of a tire.

A water based adhesive has been disclosed in U.S. Pat. No. 5,395,879 to Robert J. Murray, the entire disclosure of which is incorporated herein by reference. The patent to Murray includes a discussion of several adhesive references, however, the process of the present invention for making a water based adhesive is neither disclosed nor suggested.

SUMMARY OF THE INVENTION

Accordingly, it is an object of the present invention to provide an improved process for manufacturing a water based adhesive which may be used for bonding natural rubber compounds, synthetic rubber compounds and a combination of natural and synthetic rubber compounds.

It is a related object of the present invention to provide a process for manufacturing a water based adhesive which may be used for bonding during the formation of a tire.

In accordance with the present invention there is provided a process for making a water based adhesive comprising the steps of:

(1) supplying an elastomer emulsion, said elastomer emulsion having a measured pH within the range of about 9.0 to about 12.0;

(2) preparing a water solution comprising water and pH adjuster, said pH adjuster being added in an effective amount so that said water solution has a measured pH which is about ±10% of the measured pH of said elastomer emulsion;

(3) preparing a carbon black dispersion comprising carbon black, water, and a surfactant, said carbon black dispersion having a measured pH of about ±10% of the pH of said elastomer emulsion; and (4) mixing said elastomer emulsion of Step (1) with said water solution of Step (2), and said carbon black dispersion of Step (3) to yield a water based adhesive; wherein the water based adhesive comprises from about 25.0 to about 50.0%, by weight of an elastomer selected from the group consisting of natural rubber, synthetic rubber, butadiene rubber, polybutadiene rubber and mixtures thereof, from about 40.0 to 60.0%, by weight of water; and from about 0.5 to about 10.0%, by weight of carbon black.

In accordance with a second aspect of the present invention there is provided a process for making a water based adhesive comprising the steps of:

(1) supplying an elastomer emulsion, said elastomer emulsion having a measure pH within the range of 9.0 to 12.0;

(2) preparing a water solution comprising water and a pH adjuster, said pH adjuster being added to said water in an effective mount to adjust the pH of said water solution to within about ±10% of the measured pH of said elastomer emulsion;

(3) preparing a carbon black dispersion comprising carbon black, water, surfactants, and a pH adjuster, said pH adjuster being added to said dispersion in an effective amount so as to yield a pH of said dispersion within about ±10% of the measured pH of said elastomer emulsion;

(4) mixing said elastomer emulsion of Step (1) with said water solution of Step (2) to create an elastomer emulsion/waters solution mixture;

(5) mixing said carbon black dispersion of Step (3) with the elastomer emulsion/waters solution mixture of Step (4) to form said water based adhesive; and wherein the water based adhesive of Step (5) comprises: from about 25.0 to about 50.0%, by weight of an elastomer selected from the group consisting of natural rubber, synthetic rubber, butadiene rubber, potybutadiene rubber and mixtures thereof, from about 40.0 to about 60.0%, by weight of water; and from about 0.5 to about 10.0%, by weight of carbon black, said carbon black being selected from the group consisting of N-300 and N-200 series and mixtures thereof.

DETAILED DESCRIPTION OF THE INVENTION

The invention will now be described with reference to several preferred embodiments. An elastomer emulsion is a required starting material for the process of manufacturing water based adhesives according to the present invention. The elastomer can be selected from the group consisting of natural rubber, synthetic rubber, butadiene rubber, polybutadiene rubber and mixtures thereof. Elastomer emulsions are commercially available and generally comprise an elastomer, or mixtures thereof, suspended in an aqueous carrier.

Typically, elastomer emulsions are supplied having a pH in the range of about 9.0 to about 12.0. Especially preferred pH ranges for the elastomer emulsions of the present invention are from about 9.5 to about 11.5 and an even more preferred range is from about 9.8 to about 11.0. Although the elastomer is described herein as an emulsion, as will be appreciated, the weight percent of the elastomer in the water based adhesive disclosed herein is the weight of the elastomer alone and not the weight percent of the elastomer emulsion, i.e., the elastomer carrier is not counted in the weight percent of elastomer disclosed and claimed herein.

A water solution should be prepared for mixing with the elastomer emulsion, wherein the water solution comprises a mixture of water and pH adjusters. The pH adjusters are added to the water in an effective amount so as to bring the water solution to substantially the same pH as the elastomer emulsion. As is apparent, the pH of the elastomer emulsion must be measured prior to preparation of the water solution. The water solution should be adjusted to be within about ±10% of the measured pH of the elastomer emulsion and preferably the water solution is adjusted to about ±5% of the elastomer emulsion. Although a variety of pH adjusters can be used to manufacture the water based adhesives described herein, preferred pH adjusters include potassium hydroxide, aqueous ammonia and mixtures thereof.

A carbon black dispersion should be prepared which preferably comprises carbon black selected from the group consisting of N-300 and N-200 series (designations used in the adhesive industry for carbon blacks) and mixtures thereof. Water and surfactants are added to the carbon black to form a dispersion thereof. The surfactants can be selected from the group consisting of sodium lignosulfate, polyoxyethylene, sorbitol fatty acid ester, sulfated fatty acid and mixtures thereof. Optionally, stabilizers can be added to the carbon black dispersion, a suitable stabilizer is octylphenoxypholyethoxyethanol. The surfactants and stabilizers are preferably present in the final water based adhesive solution in a combined weight percent of from about 0.1% to about 1.8%. pH adjusters, such as those described above with respect to the preparation of a water solution, may be used to adjust the pH of the carbon black dispersion.

The pH of the carbon black dispersion should be about ±10% of the pH of the elastomer emulsion, and preferably the pH of the carbon black dispersion is about ±5% of the elastomer emulsion, prior to the addition of the carbon black dispersion into the elastomer emulsion water solution mixture. As will be apparent, the carbon black dispersion may be prepared in the absence of a pH adjuster if the pH of the dispersion falls within the desired range, i.e., about ±10% of the pH of the elastomer emulsion, and more preferably ±5% of the pH of the elastomer emulsion Additional non-essential components contemplated for use in the process for manufacturing water based adhesives as described herein include: zinc oxide, which may be present in the water based adhesive composition from about 0.02 to about 0.75%, by weight; sulfur, which may be present in amounts of about 0.01 to 0.40%, by weight; and accelerators, which may be present from about 0.005 to about 0.20%, by weight. Accelerators can be selected from the group consisting of dibenzothiezyl disulfide, tetraethyl thiuram disulfide, tetramethyl thiuram disulfide, tetramethyl thiuram monosulfide, n-tert-butyl-2-benzothiazolesulfenamide, diphenyl guanidiene and mixtures thereof. If such additional components are present, they are added during manufacture of the carbon black dispersion.

The first step of the process for manufacturing the water based adhesive is to prepare three separate mixtures, described above, such that all mixtures have essentially the same pH, i.e, the pH of any given solution does not vary by more than ±10% from the pH of any other solution, and preferably the pH of one solution does not vary by more than about ±5% of any other solution.

The first mixture is an elastomer emulsion which is essentially an elastomer suspended in an aqueous carrier. Elastomer emulsions are commercially available and they are supplied generally with a pH in the range of 9.0 to 12.0.

The second mixture is a water solution which comprises water and pH adjusters, wherein the pH adjusters are added in an effective amount to adjust the pH of the water to be substantially equal to the pH of the elastomer emulsion. The third mixture necessary for the preparation of water based adhesives of the present invention is the carbon black dispersion. The carbon black dispersion comprises carbon black, water, and surfactants and may comprise other optional ingredients discussed above. The pH of the carbon black dispersion should be substantially equal to the pH of the elastomer emulsion.

It is generally preferable to measure the pH of the commercially available elastomer emulsion and adjust the pH of the other two mixtures. It is the pH of the elastomer emulsion that is the most important because significant changes to the pH of the elastomer emulsion can cause the elastomer to coagulate, congeal or "curdle". However, as should be apparent, as long as the three mixtures are substantially equal in pH, i.e., each mixture's pH is ±10%, and preferably ±5%, of either of the other two mixture's pH, and each mixture's pH is within the range of 9.0 to 12.0, preferably 9.5 to 11.5 and more preferably 9.8 to 11.0, slight adjustments in pH can be made to any of any of the mixtures.

Carbon black, as discussed above, is a readily available commercially quantity. The dispersion of carbon black is preferably made by ball milling the carbon black, water and surfactants. The pH of the carbon black dispersion may be within the acceptable range as prepare, however, if necessary, the pH of the carbon black dispersion can be adjusted while mixing the dispersion after or during the ball milling process.

Once the three mixtures described above have been produced, and their pH ranges brought into substantial equality with one another, the mixtures can be combined in any appropriate manner. It is preferred to mix the elastomer emulsion and the water solution and then later add the carbon black dispersion to produce the water based adhesive. As should be apparent, after mixing the three mixtures, all of which have substantially identical pH values, there should be no need to further adjust the pH of the water based adhesive.

It has been found that departure from the above processing steps, i.e., the production of separate mixtures, all of which having substantially identical pH values, and then mixing them in sequence, may result in the curdling of the elastomer emulsion. Once the elastomer emulsion has curdled it is no longer suitable as an adhesive. It is the elastomer emulsion's propensity to curdle, i.e., to coagulate, congeal and/or to form small solid masses of elastomer as opposed to a uniform emulsion, which is one of the factors that has deterred successful production of water based adhesives in the past.

It is essential that the final composition of water based adhesive made by the processes disclosed herein, comprise the following compositions: from about 25.0 to about 50.0% by weight of an elastomer selected from the group consisting of natural rubber, synthetic rubber, butadiene rubber, polybutadiene rubber and mixtures thereof, from about 40.0 to 60.0% by weight of water; and from about 0.5 to about 10.0% and preferably from about 1.0 to about 5.0%, by weight of carbon black.

Adjunct material, such as zinc oxide, sulfur, accelerators, pigments, viscosity adjusters, resin emulsions, stabilizers and mixtures thereof, can be added to the water based adhesive after production or they can be added to one or more of the three mixtures described above. Typically, zinc oxide, sulfur, and accelerators are added to the water based adhesive in the following ranges: from about 0.02 to about 0.75% by weight of zinc oxide; from about 0.01 to about 0.40% by weight of sulfur; and from about 0.005 to about 0.20% by weight of accelerator.

The following example compositions are disclosed, wherein all percentages are by weight of the entire composition:

|  | #1 | #2 | #3 | #4 | #5 |
|---|---|---|---|---|---|
| Water | 51.45 | 54.40 | 51.45 | 48.70 | 51.85 |
| Natural Rubber | 41.88 | 44.47 | 41.87 | 39.67 | 43.36 |
| carbon black | 0.59 | 0.62 | 0.59 | 0.62 | 3.02 |
| Zinc Oxide | 0.04 | 0.04 | 0.04 | 0.04 | 0.36 |
| Sulfur | 0.02 | 0.02 | 0.02 | 0.02 | 0.24 |
| MBTS Accelerator | 0.01 | 0.01 | 0.01 | 0.01 | 0.12 |
| Resin Emulsion | 4.84 | — | 4.85 | 9.62 | — |
| Aqueous Ammonia | 0.14 | 0.02 | 0.14 | 0.35 | 0.13 |
| Potassium Hydroxide | 0.05 | 0.03 | 0.05 | 0.05 | 0.03 |
| Hydroxyethyl Cellulose | — | 0.26 | — | 0.18 | 0.25 |
| Sodium Lignosulfate | 0.12 | 0.13 | 0.12 | 0.13 | 0.64 |
| Stabilizer | 0.86 | — | 0.86 | 0.61 | — |
|  | 100.0 | 100.3 | 100.0 | 100.0 | 100.0 |
| Strip Adhesion (ppi)* | 118.0 | 118.3 | 110.0 | 102.0 | 117.0 |

*ppi = pounds per inch (all showed rubber tear)

Thus, it is apparent that there has been provided, in accordance with this invention, a process for manufacturing an adhesive which is substantially flee of organic solvents and is suitable for use with natural and synthetic rubbers, and the process fully satisfied the aspects and advantages set forth above. While the process of the present invention has been described in conjunction with specific embodiments thereof, it is evident that many alternatives, modification, and variations will be apparent to those skilled in the art in light of the foregoing description. Accordingly, it is intended to embrace all such alternatives, modification and variations which fall within the spirit and broad scope of the appended claims.

I claim:

1. A process for manufacturing a water based adhesive having essentially no organic solvents contained therein, said process comprising the steps of:

(1) supplying an elastomer emulsion, said elastomer emulsion having a measure pH within the range of 9.0 to 12.0;

(2) preparing a water solution comprising water and a pH adjuster, said pH adjuster being added to said water in an effective amount to adjust the pH of said water solution to within about ±10% of the measured pH of said elastomer emulsion;

(3) preparing a carbon black dispersion comprising carbon black, water, and surfactants, said carbon black dispersion having a pH within about ±10% of the measured pH of said elastomer emulsion;

(4) mixing said elastomer emulsion of Step (1) with said water solution of Step (2), and the carbon black dispersion of Step (3) to form said water based adhesive; and wherein the water based adhesive of Step (4) comprises:

from about 25.0 to about 50.0%, by weight, of an elastomer selected from the group consisting of natural rubber, synthetic rubber, butadiene rubber, polybutadiene rubber and mixtures thereof;

from about 40.0 to about 60.0%, by weight, water; and from about 0.5 to about 10.0%, by weight, carbon black.

2. The process according to claim 1, wherein said elastomer emulsion of Step (1) is first mixed with said water solution of Step (2) to create an elastomer emulsion/water solution mixture; and said carbon black dispersion of Step (3) is then mixed with said elastomer emulsion/water solution mixture to form said water based adhesive.

3. The process according to claim 1, wherein said carbon black is selected from the group consisting of N-300 and N-200 series and mixtures thereof.

4. The process according to claim 1, wherein said pH adjusters are selected from the group consisting of potassium hydroxide, aqueous ammonia and mixtures thereof.

5. The process according to claim 1, wherein the pH of said elastomer emulsion is in the range of 9.5 to 11.5.

6. The process according to claim 1, where the pH of said elastomer emulsion is in the range of from about 9.8 to about 11.0.

7. The process according to claim 1, wherein said carbon black dispersion is prepared by ball milling.

8. The process according to claim 1, wherein said carbon black is present in said water based adhesive from about 1.0 to about 5.0%, by weight.

9. The process according to claim 1, wherein said surfactants are selected from the group consisting of sodium lignosulfate, polyoxyethylene, sorbitol fatty acid ester, sulfated fatty acid and mixtures thereof.

10. The process according to claim 9, wherein said water based adhesive further comprises octylphenoxypholy-ethoxyethanol which is a stabilizer.

11. The process according to claim 10, wherein said surfactant and said stabilizer are present in said water based adhesive in a combined weight percent of from about 0.1% to about 1.8%.

12. The process according to claim 1, wherein said water based adhesive further comprises: from about 0.02 to about 0.75% by weight of zinc oxide; from about 0.01 to about 0.40% by weight of sulfur; and from about 0.005 to about 0.20% by weight of accelerator.

13. A process for manufacturing a water based adhesive having essentially no organic solvents contained therein, said process comprising the steps of:

(1) supplying an elastomer emulsion, said elastomer emulsion having a measure pH within the range of 9.0 to 12.0;

(2) preparing a water solution comprising water and a pH adjuster, said pH adjuster being added to said water in an effective mount to adjust the pH of said water solution to within about ±10% of the measured pH of said elastomer emulsion;

(3) preparing a carbon black dispersion comprising carbon black, water, surfactants, and a pH adjuster, said pH adjuster being added to said dispersion in an effective mount so as to yield a pH of said dispersion within about ±10% of the measured pH of said elastomer emulsion;

(4) mixing said elastomer emulsion of Step (1) with said water solution of Step (2) to create an elastomer emulsion/water solution mixture;

(5) mixing said carbon black dispersion of Step (3) with the elastomer emulsion/water solution mixture of Step (4) to form said water based adhesive; and wherein the water based adhesive of Step (5) comprises:

from about 25.0 to about 50.0%, by weight, of an elastomer selected from the group consisting of natural rubber, synthetic rubber, butadiene rubber, polybutadiene rubber and mixtures thereof, from about 40.0 to about 60.0%, by weight, water; and from about 0.5 to about 10.0%, by weight, carbon black, said carbon black being selected from the group consisting of N-300 and N-200 series and mixtures thereof.

14. The process according to claim 13, wherein said pH adjusters are selected from the group consisting of potassium hydroxide, aqueous ammonia and mixtures thereof.

15. The process according to claim 13, wherein the pH of said elastomer emulsion is in the range of 9.5 to 11.5.

16. The process according to claim 13, wherein the pH of said elastomer emulsion is in the range of 9.8 to about 11.0.

17. The process according to claim 13, wherein said carbon black dispersion is prepared by ball milling.

18. The process according to claim 13, wherein said carbon black is present in said water based adhesive from about 1.0 to about 5.0%, by weight.

19. The process according to claim 13, wherein said surfactants are selected from the group consisting of sodium lignosulfate, polyoxyethylene, sorbitol fatty acid ester, sulfated fatty acid and mixtures thereof.

20. The process according to claim 19, wherein said water based adhesive further comprises octylphenoxypholyethoxyethanol which is a stabilizer.

21. The process according to claim 20, wherein said surfactant and said stabilizer are present in said water based adhesive in a combined weight percent of from about 0.1% to about 1.8%.

22. The process according to claim 13, wherein said water based adhesive further comprises: from about 0.02 to about 0.75% by weight of zinc oxide; from about 0.01 to about 0.40% by weight of sulfur; and from about 0.005 to about 0.20% by weight of accelerator.

* * * * *